US008452745B2

(12) United States Patent
Ramakrishna

(10) Patent No.: US 8,452,745 B2
(45) Date of Patent: May 28, 2013

(54) ONLINE SEARCH SYSTEM, METHOD AND COMPUTER PROGRAM

(75) Inventor: Madhusudana Ramakrishna, Singapore (SG)

(73) Assignee: Affle Holdings Pte. Ltd., Tanjong Pagar (SG)

( * ) Notice: Subject to any disclaimer, the term of this patent is extended or adjusted under 35 U.S.C. 154(b) by 11 days.

(21) Appl. No.: 11/816,083

(22) PCT Filed: Aug. 30, 2006

(86) PCT No.: PCT/GB2006/003220
§ 371 (c)(1),
(2), (4) Date: Nov. 15, 2007

(87) PCT Pub. No.: WO2007/026150
PCT Pub. Date: Mar. 8, 2007

(65) Prior Publication Data
US 2008/0270379 A1 Oct. 30, 2008

(30) Foreign Application Priority Data
Aug. 30, 2005 (GB) .................... 0517585.6

(51) Int. Cl.
*G06F 17/30* (2006.01)
*G06F 12/08* (2006.01)
*G06F 9/38* (2006.01)
(52) U.S. Cl.
CPC .... *G06F 17/30864* (2013.01); *G06F 17/30867* (2013.01); *G06F 12/0888* (2013.01); *G06F 9/383* (2013.01)
USPC ............................ 707/705; 711/126; 711/106

(58) Field of Classification Search
CPC .......... G06F 17/30864; G06F 17/30867; G06F 12/0888; G06F 9/0383; G11C 11/406
USPC .................. 707/3, 5, 705, 999.005; 711/106, 711/126
See application file for complete search history.

(56) References Cited

U.S. PATENT DOCUMENTS

| 6,038,562 | A  | * | 3/2000 | Anjur et al. ............................ 1/1 |
| 6,098,064 | A  | * | 8/2000 | Pirolli et al. .......................... 1/1 |
| 6,532,490 | B1 | * | 3/2003 | Lewis et al. .................... 709/217 |
| 6,654,766 | B1 | * | 11/2003 | Degenaro et al. ..................... 1/1 |

(Continued)

FOREIGN PATENT DOCUMENTS
EP 1 447 758 A2 8/2004
EP 1447758 A2 8/2004

OTHER PUBLICATIONS

Lempel et al., "Predictive Caching and Prefetching of Query Results in Search Engines", WWW 2003, May 20-24, 2003, 10 pages, accessed online at <http://www.cs.technion.ac.il/~moran/r/PS/www12.pdf> on Jun. 6, 2012.*

(Continued)

*Primary Examiner* — Phuong Thao Cao
(74) *Attorney, Agent, or Firm* — Leason Ellis LLP

(57) ABSTRACT

A search system, method and computer program are disclosed in which characters of a search term are captured as they are entered into a client system (20) and used to predict search terms. Search results are obtained for a predetermined number of the predicted search terms and cached at the client system (20). Upon determining the complete search term has been entered, search results corresponding to the complete search term are displayed.

18 Claims, 5 Drawing Sheets

U.S. PATENT DOCUMENTS

| | | | |
|---|---|---|---|
| 6,742,033 B1* | 5/2004 | Smith et al. | 709/224 |
| 6,779,119 B1* | 8/2004 | Moshfeghi et al. | 726/23 |
| 7,302,425 B1* | 11/2007 | Bernstein et al. | 1/1 |
| 7,330,846 B1 | 2/2008 | Dirisala et al. | 707/754 |
| 7,467,131 B1* | 12/2008 | Gharachorloo et al. | 707/3 |
| 7,487,145 B1* | 2/2009 | Gibbs et al. | 1/1 |
| 7,490,080 B2* | 2/2009 | Longobardi et al. | 1/1 |
| 7,587,398 B1* | 9/2009 | Fredricksen et al. | 1/1 |
| 7,647,312 B2* | 1/2010 | Dai | 707/999.004 |
| 7,680,797 B1* | 3/2010 | Singh et al. | 707/781 |
| 7,836,044 B2* | 11/2010 | Kamvar et al. | 707/713 |
| 2002/0042923 A1* | 4/2002 | Asmussen et al. | 725/92 |
| 2003/0018624 A1* | 1/2003 | Hsiao et al. | 707/3 |
| 2003/0055816 A1* | 3/2003 | Paine et al. | 707/3 |
| 2003/0200282 A1* | 10/2003 | Arnold et al. | 709/219 |
| 2004/0133538 A1* | 7/2004 | Amiri et al. | 707/1 |
| 2004/0153440 A1* | 8/2004 | Halevy et al. | 707/3 |
| 2004/0236736 A1* | 11/2004 | Whitman et al. | 707/3 |
| 2004/0249682 A1* | 12/2004 | DeMarcken et al. | 705/5 |
| 2005/0015488 A1* | 1/2005 | Bayyapu | 709/225 |
| 2005/0256846 A1* | 11/2005 | Zigmond et al. | 707/3 |
| 2005/0283468 A1* | 12/2005 | Kamvar et al. | 707/3 |
| 2006/0106769 A1* | 5/2006 | Gibbs | 707/3 |
| 2006/0122976 A1* | 6/2006 | Baluja et al. | 707/3 |
| 2006/0161541 A1* | 7/2006 | Cencini | 707/5 |
| 2006/0173950 A1* | 8/2006 | Longobardi et al. | 709/201 |
| 2006/0212524 A1* | 9/2006 | Wu et al. | 709/206 |
| 2006/0259479 A1* | 11/2006 | Dai | 707/4 |
| 2007/0027870 A1* | 2/2007 | Kim et al. | 707/8 |
| 2007/0055652 A1* | 3/2007 | Hood et al. | 707/3 |
| 2007/0088681 A1* | 4/2007 | Aravamudan et al. | 707/3 |
| 2007/0088686 A1* | 4/2007 | Hurst-Hiller et al. | 707/4 |
| 2007/0143262 A1* | 6/2007 | Kasperski | 707/3 |
| 2007/0157016 A1* | 7/2007 | Dayan et al. | 713/2 |
| 2007/0198656 A1* | 8/2007 | Mazzaferri et al. | 709/218 |
| 2008/0040395 A1* | 2/2008 | Danoyan | 707/200 |
| 2008/0222362 A1* | 9/2008 | Chang et al. | 711/133 |
| 2009/0006543 A1* | 1/2009 | Smit | 709/203 |
| 2010/0082604 A1* | 4/2010 | Gutt et al. | 707/721 |

OTHER PUBLICATIONS

Xie et al., "Locality in Search Engines Queries and Its Implications for Caching", IEEE InfoCom 2002, 10 pages, accessed online at <http://www.cs.cmu.edu/~ylxie/papers/infocom02.pdf> on Jun. 6, 2012.*

Adam Pash, "Yahoo Search Direct Is Yahoo's Google Instant, and It's Pretty Nice", Mar. 23, 2011, 3 pages, accessed online at <http://lifehacker.com/5784957/yahoo-search-direct-is-yahoos-google-instant-and-its-pretty-nice> on Jun. 6, 2012.*

Dar et al., "Semantic Data Caching and Replacement", In Proceedings of the 22nd VLDB Conference, Bombay, India, 1996, 12 pages.*

Nottingham, Mark, "Optimizing Object Freshness Controls in Web Caches", In Proceedings of the 4th International Web Caching Workshop, 1999, 5 pages.*

White Paper, "A Technical Review of Caching Technologies", Blue Coat System, copyright 2007, 10 pages.*

Slawski, Bill, "Predictive Search Query Suggestions", May 8, 2009, 16 pages, accessed online at <http://www.seobythesea.com/2009/05/predictive-search-query-suggestions/> on Feb. 5, 2013.*

Anonymous: "Mac OS X Tiger: Spotline" [Online] Nov. 20, 2004 pp. 1-2.

Anonymous: "Mac OS X Tiger: Spotlight" [Online] Nov. 20, 2004 pp. 1-2, XP002418181 Internet—URL http://web.archive.org/web/20041120034907/www.apple.com/macosx/tiger/spotlight.html [Retrieved on Nov. 13, 2007].

* cited by examiner

ONLINE SEARCH SYSTEM, METHOD AND COMPUTER PROGRAM

CROSS-REFERENCE TO RELATED APPLICATIONS

This application is a 35 USC §371 application of International Application No. PCT/GB2006/003220 filed Aug. 30, 2006 which claims priority to Great Britain Application No. 0517585.6 filed Aug. 30, 2005, both of which are hereby incorporated by reference in their entirety.

FIELD OF THE INVENTION

The present invention relates to a search system and method that are particularly applicable to mobile devices such as mobile phones.

BACKGROUND TO THE INVENTION

Mobile phones have become ubiquitous devices all over the world. With the availability of fast data networks like GPRS and 3G, it is now possible to extend internet services to the consumer on the mobile phone. However, the limited input and display capabilities and limited resources of mobile devices means the layout and input mechanisms of typical websites are unsuitable.

On the internet, search is one of the most popular applications. People use search engines like Google, Yahoo and MSN by visiting their websites and entering a search term. Consumers can currently use their mobile phones to access these very search engines. However, they are made available in a modified format optimized for mobile devices. One protocol used for internet access by mobile devices is the Wireless Application Protocol (WAP). For example, on the mobile phone wap.google.com delivers services that are similar to http://www.google.com.

In addition to input and display issues, WAP based systems introduce considerable latency in requiring the user to launch a special application, navigate to the URL of the search engine (for example: wap.google.com) and enter his term. There is a significant delay associated in each of these actions. In particular, the latency of GPRS and 3G networks is much higher than what people are used to on the desktop internet. While GPRS/3G networks have significant bandwidth, initial connection setup and latency can be as high as 500 ms-2 s.

Alternative mechanisms exist for obtaining search results on a mobile phone. One such mechanism includes sending a SMS text message in a predefined format to a known number (short code) with a search term. The search is performed remotely and the results are then sent back to the consumer as an SMS message. Not only are such systems limited in functionality and unintuitive, there is no way of refining searches. Additionally, images and sound cannot be delivered due to limitations in the SMS format.

In both cases, due to limited space on the mobile phone screen, it is difficult to display sponsored links which generate revenue for the search engine.

The most commonly used applications on the mobile phone are voice calls and text messaging. Despite the availability of 3G and GPRS, most consumers do not significantly use any of the new data services offered by network service providers. A major reason for this is the latency and user-unfriendliness of these services.

STATEMENT OF INVENTION

According to an aspect of the present invention, there is provided a method for providing search results comprising:

(a) capturing characters of a search term as they are entered into a client system;
(b) predicting search terms in dependence on the captured characters;
(c) obtaining search results for a predetermined number of the predicted search terms;
(d) caching the obtained search results at the client system; and,
(e) upon determining the complete search term has been entered, displaying search results corresponding to the complete search term, from the cached search results where the complete search term corresponds to one of the cached search results, at the client system.

Preferably, steps (b), (c) and (d) are repeated for each captured character, wherein the search results cached in step (d) are refreshed during each repetition.

Preferably, step (c) further comprises:
ranking the predicted search terms and selecting the predetermined number of predicted search terms from the highest ranked search terms.

The ranking may be performed in dependence on one or more of:
probability of use of a term, prior user searches, user location, user interests, and similar user searches.

Preferably, step (a) further comprises transmitting the captured characters to a remote server system and wherein step (c) further comprises transmitting the obtained search results to the client system.

The method may further comprise:
maintaining a local cache of search terms and corresponding search results at the client system; and,
displaying a search result from the local cache if a substantially corresponding search term is entered into the client system. The search terms and corresponding search results maintained in the local cache may be selected in dependence on a rank of search terms, the highest N search terms and corresponding search results being selected to be locally cached, wherein N is determined in dependence on one or more of:
storage capacity of the client system and available network bandwidth. The rank may be determined in dependence on one or more of:
probability of use of a term, prior user searches, user location, user interests, and similar user searches.

Preferably, the local cache is refreshed periodically. The method may further comprise displaying a search result from the local cache of a substantially corresponding search term while awaiting the results of steps (b)-(e).

The method may further comprise merging search results from the local cache with those cached in step (d) and displaying the merged search results in step (e).

According to another aspect of the present invention, there is provided a search system comprising a remote server system arranged to communicate with a client system, wherein the remote server system is arranged to receive characters of a search term as they are entered into a client system, predict search terms in dependence on the received characters, obtain search results for a predetermined number of the predicted search terms and transmit the obtained search results to the client system, the client system being arranged, upon determining that the complete search term has been entered, to display search results corresponding to the complete search term from the received search results where the complete search term corresponds to one of the received search results.

The remote server system may be arranged to predict the search term and obtain search results and transmit the obtained search results after receipt of each character of the search term.

The system may further comprise an information repository comprising data on search terms, wherein the remote server system is arranged to rank the predicted search terms in dependence on data on said search terms in said information repository and select the predetermined number of predicted search terms from the highest ranked search terms.

The data on search terms may include one or more of: probability of use of a term, statistics of prior user searches, association of a term with a location, user interests, and probability of matching similar user searches.

The client system may further comprise a local memory cache and is arranged to obtain of search terms and corresponding search results for the local memory cache from the remote server system, the client system being arranged to display a search result from the local memory cache if a substantially corresponding search term is entered into the client system.

The search terms and corresponding search results obtained for the local memory cache may be selected in dependence on a rank of search terms, the highest N search terms and corresponding search results being selected for the local memory cached, wherein N is determined in dependence on one or more of:
storage capacity of the client system and available network bandwidth.

The client system may be arranged to merge appropriate search results from the local memory cache with those received from the remote server system and display the merged search results.

According to another aspect of the present invention, there is provided a computer program carrier encoding computer program code for:
(a) capturing characters of a search term as they are entered into a client system;
(b) predicting search terms in dependence on the captured characters;
(c) obtaining search results for a predetermined number of the predicted search terms;
(d) caching the obtained search results at the client system; and,
(e) upon determining the complete search term has been entered, displaying search results corresponding to the complete search term, from the cached search results where the complete search term corresponds to one of the cached search results, at the client system.

The computer program carrier may further comprise computer program code for:
maintaining a local cache of search terms and corresponding search results at the client system; and,
displaying a search result from the local cache if a substantially corresponding search term is entered into the client system.

The present invention seeks to provide an internet/intranet search method and system suitable for use by mobile devices in which latency is reduced in comparison to conventional systems and methods and in which user friendly user interface is provided. Users can intuitively use search on their mobile phone via an option within their SMS application. The latency and delay associated with such search are reduced by intelligent prediction of search terms and caching of the required results before the user submits a search query.

Earlier, it was described that the latency involved in GPRS/3G networks can be significantly high, especially during connection setup. For a user who is looking for some important information immediately, those seconds of delay in addition to activating his browser on the mobile phone can seem significant. In order to address this, embodiments of the present invention seek to apply techniques to reduce latency of results even over slow GPRS connections and to also show results even when the network is not usable. These techniques may include:
  Pre-fetching of terms: databases and algorithms are used to guess what the user is typing while he is typing it and deliver possible terms and their search results even before the user has finished typing his query;
  Pre-caching of likely search terms and their results: Even when the client is not connected or connection is slow we can still serve results from a local client cache. A caching algorithm tuned for mobile networks and handsets is applied to search databases to periodically push user specific search terms results and other content to the local client cache. Therefore, if the network is down or congested, the system is still able to show the user search results. Even if the network is slow and connection setup is taking time, search results can be served from the local cache and later merged with the latest results when the network is connected.

Embodiments of the present invention complement the system and method described in co-pending co-assigned patent application Nos. PCT/GB20061001499 and PCT/GB2006/001875, the contents of which are incorporated herein by reference.

By providing a messaging system client for a mobile device that provides search facilities in accordance with an embodiment of the present invention and search results dependent on communications via the messaging system, users are habituated to expect term search results while using the messaging application. The application is arranged to display search results in a friendly way based on the terms in the message they are typing or viewing. In a preferred embodiment of the present invention, direct search functionality is introduced into the messaging system application as a selectable option. In order to make this option as intuitive as possible, switching from messaging to direct search is preferably performed via a single key press. This manner of operation is much more accessible and comfortable to the user than with opening a browser and typing in the URL of a search engine.

Instead of forcing users to activate a separate application (browser) in order to do data transactions including search, embedding such functionality within the text messaging software increases the likelihood of its usage. Such functionality could be activated immediately from within the text messaging software, which would immediately transform the look and feel of the application and allow users to do a search. A 'one click' search mode activation is available from a messaging application. The messaging application initiates a connection to a search server so switching to search mode does not imply a delay for connection setup. Even if the connection was not established the application maintains a cache of common search results and can still operate until the connection comes online. The overall result provides to the user what seems to be a faster search experience.

BRIEF DESCRIPTION OF THE DRAWINGS

Embodiments of the present invention will now be described in detail, by way of example only, with reference to the accompanying drawings in which.

DETAILED DESCRIPTION

Figure 1:
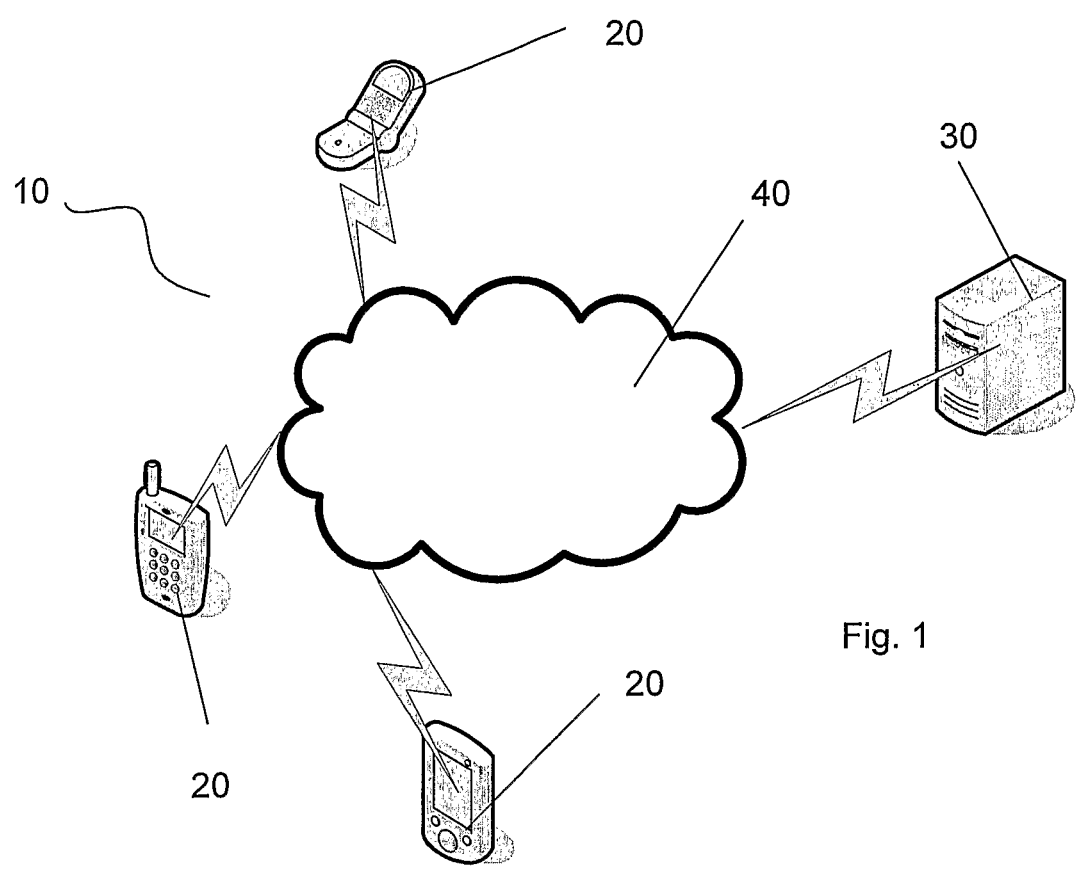
FIG. 1 is a schematic diagram of a search system according to an embodiment of the present invention.

FIG. 1 is a schematic diagram of a search system according to an embodiment of the present invention.

The search system 10 includes a client system 20 and a remote server system 30. The client system 20 is arranged to communicate with the remote server system 30 via a wireless data communications network 40.

The client system 20 and remote server system 30 preferably have a persistent connection or operate a regular connection to enable exchange of data.

As a user inputs the letters of a term for a search query into the client system 20, they are transmitted to the remote server system 30 where a prediction is performed to identify what the likely search terms are. The likely terms are used to perform searches by the remote server system and provide corresponding results to the client system 20. Thus, the search results for the search query will, where the search term is accurately predicted, be present even before the term has been completely types and can therefore be displayed immediately once the full word is input.

Figure 2:
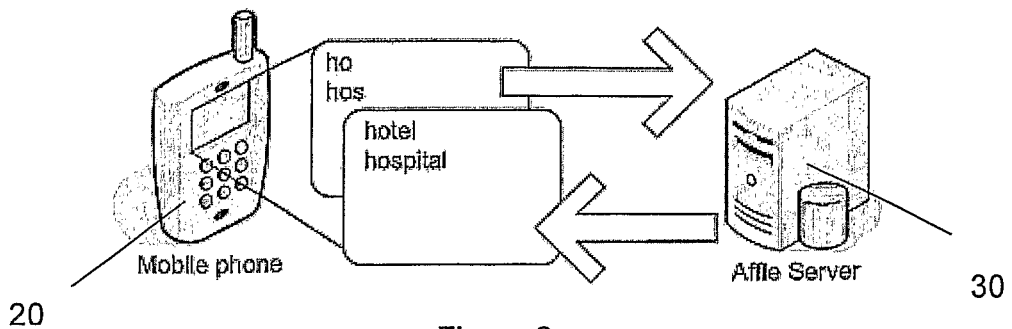
FIG. 2 is a simplified schematic diagram of the system of FIG. 1.

One example is illustrated in FIG. 2. As the user is typing "h", "o", two likely terms are hotel and hospital. It will take 2-3 seconds more for the user to complete the full term. During this time, we can pre-fetch actual results for both the terms and cache it. Once the full word is complete, the actual results can be shown instantly. This provides a perception to the user that the search engine is qualitatively much faster than other engines and would encourage him to use it more often.

Optionally, the client system 20 may be a subsystem of a user device and is activated on demand by the user. In such a situation, the connection may be persistent only when the client system 20 is active. Alternatively, or in addition, scheduled connections may be established even when the client system 20 is inactive to allow it to be refreshed by the remote server system 30.

Preferably, the client system 20 is run by a mobile communications device such as a mobile telephone, PDA or the like. Embodiments of the present invention are particularly suitable for use where the wireless data communications network 40 operates under GPRS, 3G or similar protocols. However, the embodiments of the present invention are not limited to use under such protocols and can be used in any data communications network with a potential decrease in latency in obtaining search results, irrespective of the network type, bandwidth and the like.

In preferred embodiments, the client system 20 may also operate even when there is no connection possible to the data communications network 40 and/or remote server system 30. In such an embodiment, search functionality is provided via the same algorithms but operations and results are provided from previously cached data. Specific features of such embodiments are discussed in detail below.

Various information types may be used by embodiments of the present invention to improve prediction rates of likely search terms. In each case, examples of how this information may be used are discussed in detail later. The information types may include:

User Profile

Users may register their interests and preferences with the remote server system 30. The user may use the messaging application to set his or her personal profile and preferred topics. Alternatively or in addition, a regular website may be provided for such a function.

For example, a user can set his profile as a New York based, English speaking male, 25-30 years with interests in finance, sports, weather and food.

User Activity History

Subject to privacy agreements with the user, the user's previous messaging, search, transaction and other activity may be stored and mined for statistical preferences.

Term Probability Distribution Based on all Searches

Subject to privacy agreements, the system stores and mine all activity of all users using it. This data is then used to construct probability distributions for search terms.

Group Probability Distributions

Subject to privacy agreements, the system stores and mine activity of all users. Users with similar profile data are grouped together and the data mined from their respective search activities is then used to construct group probability distributions for search terms for the group. In order to perform grouping, a user's profile is quantized into a set of strings and the similarity measure between profiles is the number of matching/similar strings from both sets.

For example UserA may have a profile (25-30, M, Singapore, finance, sports, and movies) and UserB may have a profile (40-45, M, Singapore, finance, golf, movies). The common strings are "M", "Singapore", "finance", and "movies". The number of similar strings is hence 4 and hence our similarity measure XYSIM=4. In order to produce the grouped probability distribution for a user the system identifies other users with a similarity that exceeds a predetermined threshold (for example 4). Term probabilities are calculated by summing the databases of each identified user's activity weighted by their similarity measure XYSIM.

Location and Time Based Data

Subject to privacy agreements, the system may stores and mines activity of all users, the location where the activity occurred, and the time at which it occurred. This data may then be used to construct probability distributions for search terms for specific locations at specific times. For example, in the central business district during working hours the query "stock" will be popular but after working hour and during dinner time "steak" may have a higher probability.

Current and Historic Network Traffic Data

A database of network traffic and congestion on the utilized 3G/GPRS networks may be maintained. This database may be created from statistics reported network operators and/or client systems. Several parameters like available bandwidth and latency to the remote server system 30 from the client system 20 are tracked and stored.

Information about Client Handset and Software

Once the client system 20 is loaded on a handset it may report the handset configuration including its capabilities (3G or GPRS etc) and memory available for caching. This information may be used in conjunction with network traffic data for scheduling connections, cache refreshment and the like.

A pre-fetch algorithm is operated by the remote server system 30 to identify predicted terms provide corresponding results. The pre-fetch algorithm may use any number of the above-described information types to improve prediction accuracy.

Figure 3:
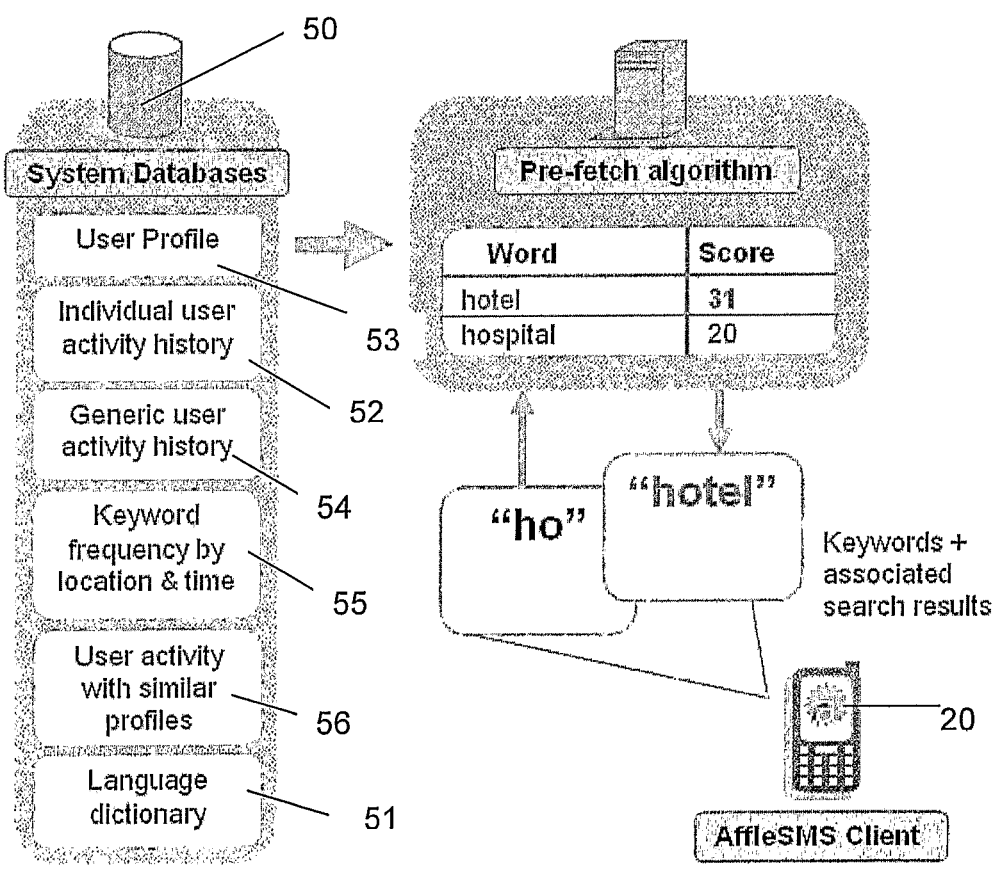
FIG. 3 is a schematic diagram illustrating an example information repository used by the remote server system for pre-caching and pre-fetching.

FIG. 3 is a schematic diagram illustrating example information repository 50 comprising databases 51-57 used by the remote server system 30 for pre-caching and pre-fetching algorithms. It will be appreciated that the number and combination of databases used are flexible depending on implementation.

The databases may include:

Language Database 51
  For every language the remote server system 30 maintains a language database 50 comprising a dictionary of possible terms. This dictionary is preferably constructed both from SMS specific and normal language dictionaries.
  Associated with each word in the dictionary is the GPnum, a number representing the probability of use. For example, the word "call" may have a GPnum of "121". GPnum numbers do not define exact probabilities—higher numbers mean that the word is more likely to occur in normal search. These numbers are calculated periodically to represent the actual day to day usage in the overall system. The simplest way to do this is to simply set GPnum to be the number of times the word has been used in the system across all users in the last month.

User Activity Database 52
  Associated with each word and a particular user is a SPnum—a number representing the historical probability of the word being used by specific user. The simplest way to do this is simply set SPnum for a word and user to be the number of times the word has been used in the system by this user in the last month.

Location Database
  Associated with each location in a mobile network is list of terms commonly typed there and a number representing the probability of use called LPnum. As an example for the Singapore Changi airport location the words "flight" and "schedule" and "hotel" are considered to have higher probabilities of occurrence and a higher LPnum.

Interest Database
  Associated with each word is a set of "interests". For example, the word "hotel" has the interests "travel" and "business" associated with it. Words may have no interests. The set of interests for a word can be manually set or simply selected using a clustering algorithm for a limited set of interests and a history of all text in the system and also using a simple thesaurus. The simplest implementation is to assign an interest to a word if both the interest and word appear frequently in the same text in the database of searches or if a language thesaurus shows them to be connected. Assigning words to interest can also be done manually.

User Profile Database 53
  Associated with each user is a profile which is simply a subset of the total "interests" available in the system. Example the user "Mr. Bean" may have the interests "travel", "business", "weather" and "lottery".

Probability Database 54
  A general probability distribution for terms bases on searches of all users is calculated and terms weighted appropriately.

Group Probability Database 56
  Associated with each user is a dictionary of words with the probability of users with similar profiles using those words. As described before we are able to find users with similar profiles and assign number representing the probability of being used to each word they have typed. For this user and a word we obtain a number RPnum to represent the probability of users with related profiles using this word.

User Location Database 55
  Associated with the possible locations and times are probabilities of terms. As an example we can construct the dictionary of "10 am to 12 Noon at Changi airport." The dictionary simply has all the words that were typed by users in the system passing through that location during that time. As an example the "LTnum" we assign to the word is simply the number of times the word has been used in the last month at that location in that time interval. Location is reported to us by client software or made available by operator.

While the above information repository 50 has been described as separate databases 51-57, it will be appreciated that many implementations are possible. For example, a single database may be maintained with the various information types being held in separate tables each linked to respective entries on a master word list.

In one embodiment, a data structure used in the pre-fetch algorithm is a Trie data structure (an ordered tree data structure). The trie comprises an ordered tree of word stems building into the available terms for the user's language.

Figure 4:
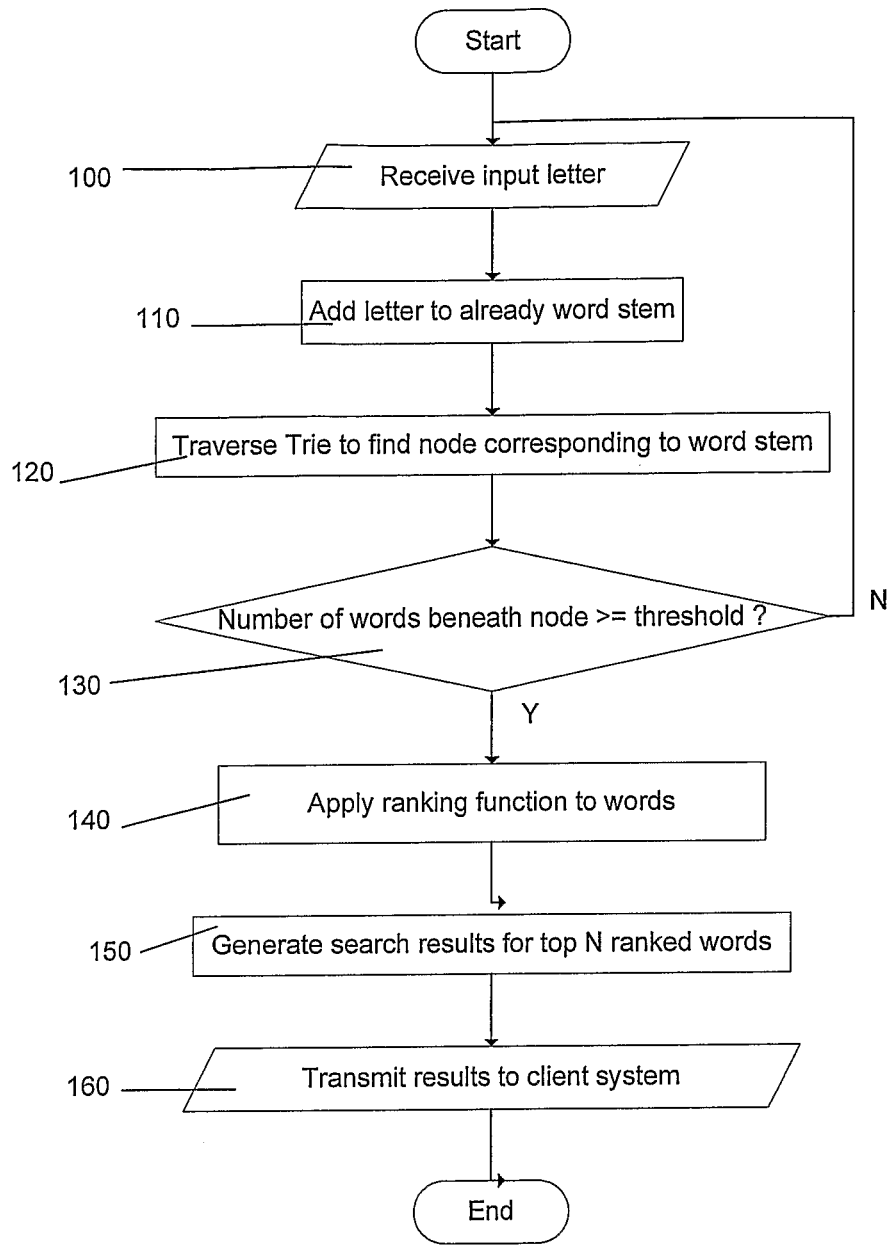
FIG. 4 is a flow diagram of a pre-fetch algorithm for use in embodiments of the present invention.

When processing a letters of a term being input to predict the term, the pre-fetch algorithm matches the letters input to an appropriate node of the trie. FIG. 4 is a flow diagram of a pre-fetch algorithm according to an aspect of the present invention.

In step 100, the algorithm receives a next letter of a term input by the user. In step 110 the algorithm adds the letter to the already input letters to build the word stem. In step 120 it passes down the trie and arrives at a node for the current word stem entered. In step 130, it is calculated if there are fewer than, or equal to, a predetermined number of possible words in the sub-tree below. If so, then in step 140 the algorithm applies a ranking function to the possible words. Depending on the configuration of the client and system, the highest ranked word or top N highest ranked words (where N is a predetermined maximum number of results to be returned) are used to generate searches in step 150 and their respective results transmitted to the client system 20 in step 160.

The rank of each word produced by the ranking function is dependent on its GPnum, SPnum, LPnum for the word, user, location, and the number of interests common to the user's profile and the interests associated with the word.

In one example:

We have the user Mr Bean with an interest set: "travel"; "business"; and, "lottery".

Figure 5:
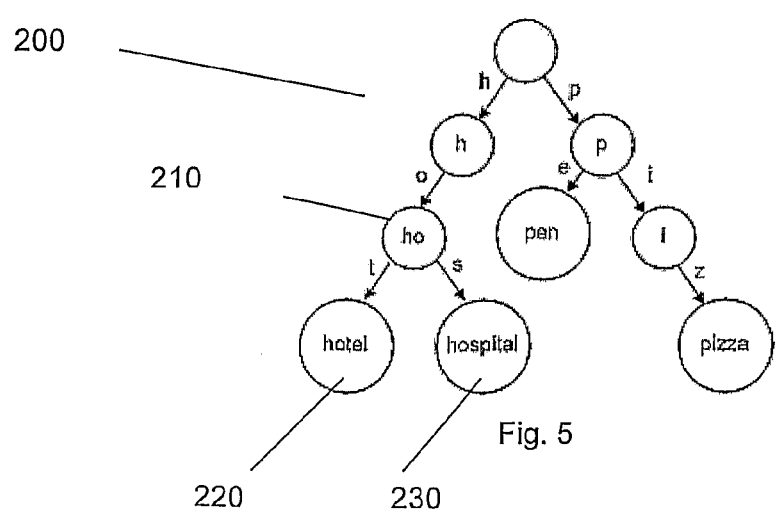
FIG. 5 is a diagram illustrating an excerpt of a Trie for a word stem used by the algorithm of FIG. 4.

He is at Changi Airport—a location with a location specific dictionary and likely LPnum numbers. The text typed is "ho". FIG. 5 is a diagram illustrating an excerpt of a Trie 200 for the word stem. The node 210 corresponding to word stem "ho" has to words in its sub-tree, "hotel" 220 and "hospital" 230. Assuming 2 or more possible results are acceptable, the algorithm progresses to the ranking function. Table 1 details the calculations of the ranking function for the words:

TABLE 1

| Word | GPnum | SPnum | LPnum | Word related interests | User Interests | User-Word interest common rank (UWICR) | Related users: RPnum | Location and Time: LTNUM | Final Rank (GPnum + Spnum + LPnum + UWICR + RPnum + LTnum) |
|---|---|---|---|---|---|---|---|---|---|
| Hotel | 13 | 1 | 1 | Travel, business | Travel, business, lottery | 2 | 2 | 2 | 21 |
| Hospital | 10 | 0 | 0 | Health | | 0 | 1 | 0 | 11 |

The number of interests common between the Word Related Interests and the User Interests are used to compute the "UWICR".

The final rank for the words was in this example:

$$GPnum + SPnum + LPnum + UWICR + RPnum + LTnum$$

The rank function is:

$$FinalRank = Kw*Gpnum + Ks*SPnum + Kl*LPnum + Ki*UWICR + Krp*RPnum + Klt*LTnum$$

In the above table, for simplicity, we use:

$$Kw = Ks = Kl = Ki = Krp = Klt = 1$$

However, these constants can be tuned for better results.

In the above example, if only one result set was to be pre-fetched then the result set for "hotel" (which has the highest final rank) would be passed to the client system 20. If more than one result set was to be pre-fetched, the results for both Hotel and Hospital would be returned.

For any term we can also use location to rank search results. The client system 20 may have access to user's location; in which case this can be factored into the above selection criteria to order the search results for the predicted or given term. As an example, a user who types "piz", will be predicted to be looking for "pizza" and if location based services are available, he or she will have the links for nearby pizzerias sent to his mobile for display and caching.

The final operation of the pre-fetch algorithm is to provide a relevance number a "RelRank" per content or ad or URL we intend to show the user. As we have the user's location we use various strategies either restricting our search to only those target items that have a location or simply adding a Proximity constant "PC" to the RelRank of items that are at nearby locations.

In a preferred embodiment, the search method and system enable pre-caching—guessing search terms and results for local caching for use when client is in offline mode.

Figure 6:
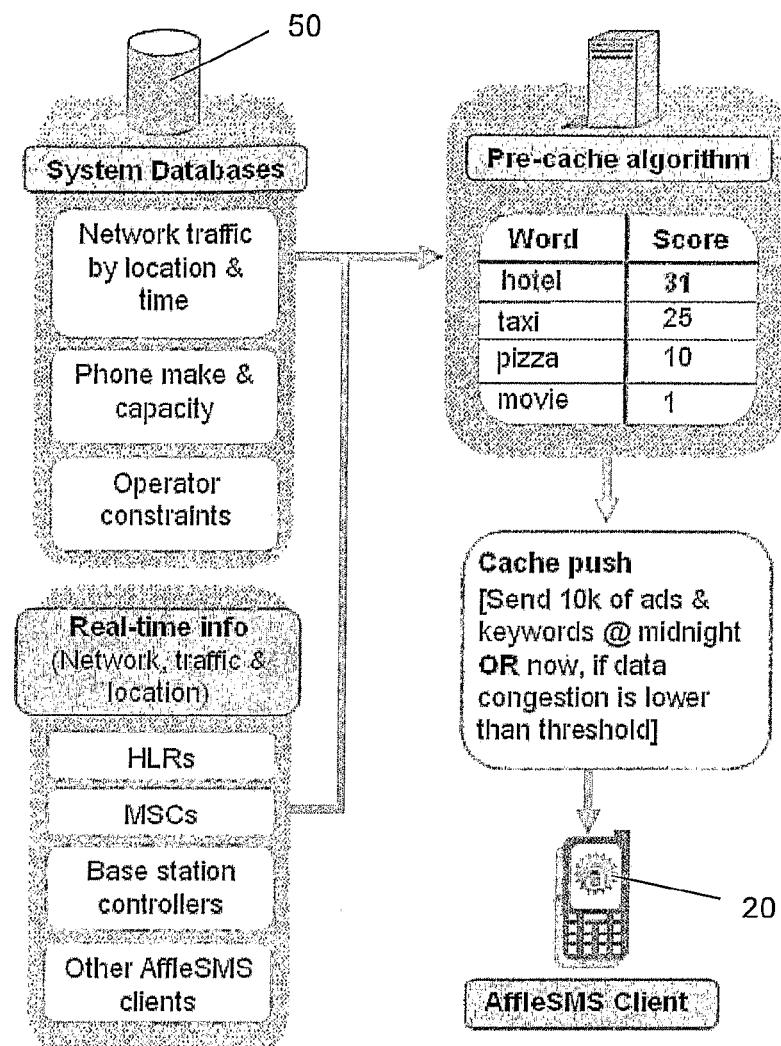
FIG. 6 is a schematic diagram of a search system according to another embodiment of the present invention; and, FIG. 7 is a schematic diagram of a preferred implementation of an embodiment of the present invention.

As is illustrated in FIG. 6, the system and method can pre-compute likely search terms and locally cache results on a user's phone to be used in the eventuality that the connection to the remote server system 30 is delayed or not operational. Optionally, even if the client is online, locally pre-cached results for a term that approximately match a search term may be displayed before the pre-fetched results are obtained. In such a configuration, the locally cached results would be merged with the additional results as and when the remote server system 30 becomes contactable.

As discussed above, the remote server system 30 has access to the most popular terms being searched for by other users, as well as this particular user in his history. We can periodically compute the Final Rank as in the above Table 1 for all words for a user. The results for the 10 (or other predetermined number) highest ranked terms are then locally cached within the mobile phone. Such a cache could be refreshed automatically when the client system 20 is being used so as to ensure that the information is still current and relevant. In this way, when the user is looking for information, it may not even be necessary for him to have access to the GPRS/3G network.

As an example the caching algorithm identifies that the user's profile and location are likely for him to be interested in pizza, beer, etc and caches the appropriate results ranked by location to his mobile handset. In such a scenario, even if the client is not connected with GPRS/3G the system will still show local pizzerias in its search results when the user barely has typed "piz".

A user's search query may have multiple terms and some may match those that are cached. If the client is not connected then we can rely exclusively on the locally cached results. Even if a client is connected we pre-display partial or full matches from locally cached data, replacing this with the full results from our server when available.

In order to decide when to cache and how much, a database of mobile networks, data transfer traffic or data transfer including GPRS and 3G traffic is maintained. This data is provided by mobile operators and is also obtained from client systems 20 that report local data traffic conditions every time it connects to the remote server system 30. Amongst other parameters, the client system 20 reports statistics for location, time, latency of network and data transfer rates. This data is used to compute a map of available bandwidth and latency for each network by location and time of day and day of week. Both historic statistical information on data traffic/congestion by location and time and real time information as reported by operators or measured by client systems may be used in the decision on when to update local caches and by what amount.

For example, the operator Airtel using GPRS for data transfer, in the zone near Bangalore Airport on Sunday morning 8-9 am may have a ping time of 30 ms to the remote server system 30 with a data transfer rate of 1 KB/sec.

The decision to update a mobile phone's cache is based on available bandwidth for a mobile device the time and available space on the mobile device. Optionally, network operators may also be able to trigger cache updates at the times they desire and only up to the data amount they desire.

As an example, the user Mr Bean may have with 100 Kbytes available for cached results on his mobile device. The remote server system 30 determined that in his location, data bandwidth is maximal at 3 am. The system 30 therefore instructs his client to receive 100K of cached terms and results at 3 am. If the network operator has placed a restriction on only 50 K data download in a day, this can be honored and the client instructed accordingly.

Clients can be instructed when they connect to the remote server system 30 to tune their periodic update frequencies according to the frequency calculated. Optionally, the remote server system 30 can force the client to fully refresh its cache using a WAP push or application directed message. Forcing of a full cache refresh may be done when the client system 20 enters a new location (operator can report this or the client system 20 can connect to the remote server system 30) or some interesting new content or advertisement is available that we wish the user to see.

In one implementation, data on the user's location (base station) may be obtained by querying the operator's HLR (Home Location Register). This data may be outdated and if the record is older than a threshold, for example one hour, a paging request can be triggered to get the current data.

To obtain real-time traffic data, monitoring agents may be introduced at the operator's base stations or base station controllers and at MSC (Mobile Switching Centers).

The current data traffic condition at a user's location can also be estimated by storing data traffic measurements made by other client systems that were in that location and had connected to the remote server system 30 recently. Client systems 20 can be configured to report all statistics for all data interactions to the remote server system 30 on a routine basis or on demand, and also can be configured to periodically actively check and report traffic conditions. Even uploading the results of a simple "ping" will be sufficient for estimating latency and packet loss rates and estimation of network congestion from that location to the remote system server.

This information is then used to tune the caching strategy.

If new data is available for the client to cache and if the real time network information shows that there is available data bandwidth, the data can be sent over immediately. Alternatively, the system may wait for a periodic low in data traffic as predicted by the statistical database. Periodic updates may also be skipped if network conditions are bad.

In order to ignore statistical inference, the system may simply wait for the network congestion to fall below a threshold to send cache updates.

In addition to reducing the latency and improving usability of the search function, it is also possible to provide a way to embed a sponsored result for the search term. The sponsored result is shown at the bottom of the screen as a graphical image or plain text. It is also possible for the sponsored result to be an audio or video recording.

For example, standard search results may be displayed in blue and the sponsored results in red. The search result can be selected by using the scroll keys till it is highlighted and then selected by pressing the center/select key.

The user can optionally provide information to the advertiser if desired. This can be done in a private manner to ensure the user's phone number is not communicated to the advertiser. Clicking on a sponsored search link with a "Call me Now" action can cause the client system 20 to contact the remote server system 30 with the user Id, location, time, ad Id, and notify the advertiser to call him back. The remote server system 30 acts as the bridge between the user and the advertiser without revealing the user's phone number to the advertiser. The advertiser is notified of user interest via an email or on a web site or is called up by the remote server system 30 acting as a phone call bridge. Depending on the privacy policy, it can be chosen whether or not to reveal details of the user like his profile and location. As intermediary, the remote server system 30 sets up call to both the user and the advertiser so that they can talk whilst not revealing the user's number.

It will be appreciated that although the above described embodiments refer to hardware systems, embodiments of the present invention can equally be implemented in software, firmware or some combination of software, firmware and hardware.

Although operation of pre-fetching and pre-caching algorithms has been described in the above embodiments as being performed at the remote server system 30, it will be appreciated that implementations are also possible where these functions can be performed at the client system. Indeed, in the case where no connection to the remote server system 30 is possible and searching is based on cached results, the client system may need to perform at least a subset of the pre-fetching algorithm to determine the result set to present.

It will further be appreciated that the pre-fetching and pre-caching systems could be implemented separately and, whilst complementary, neither are essential for the other's operation. Indeed, the pre-fetching system could operate with other forms of off line stores and other search systems and the pre-caching system could also operate in conjunction with other local and online search systems.

Figure 7:
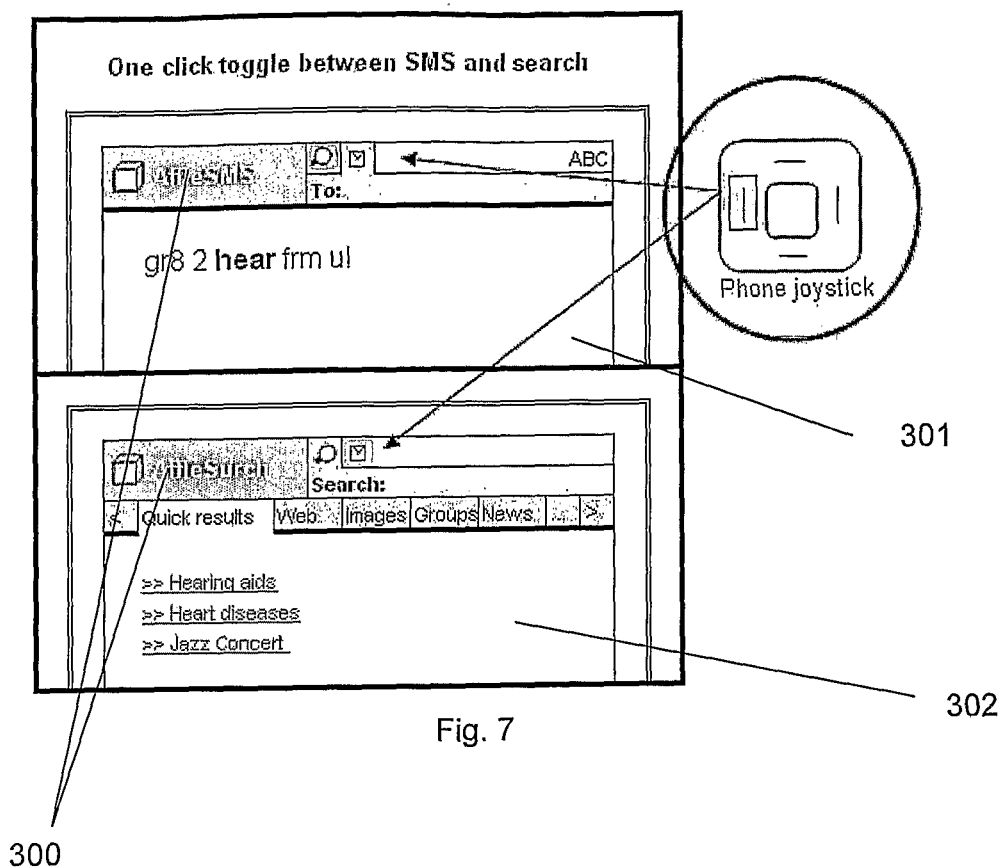

FIG. 7 is a schematic diagram of a preferred implementation of an embodiment of the present invention. In a preferred embodiment of the present invention, the search functionality is incorporated into a messaging system application 300 for a mobile phone or the like. The messaging system application 300 includes a messaging window 301 and a search window 302 that are switchable via a predetermined operation (preferably a single key-press or joystick operation), as is illustrated in FIG. 7. Preferably, the messaging system application 300 maintains a connection with the remote server system 30 whilst it is in use such that the user experiences no delay in connection setup etc when switching from the messaging window to the search window. The messaging application preferably incorporates functionality described in co-pending co-assigned patent application Nos. PCT/GB2006/001499 and PCT/GB2006/001875, the contents of which are incorporated herein by reference

The invention claimed is:

1. A method for providing search results to a client system, comprising:
    executing an algorithm that pre-fetches into the client system one or more search terms and corresponding search results from a remote server system concerning searches presented to the remote server system by users other than users of the client system;
    maintaining a local cache of the pre-fetched search terms and corresponding search results at the client system;
    during the course of entry of one or more search terms performing at least one ordered repetition of the steps in order (a)-(c):
    (a) capturing characters of one or more search terms as they are entered into the client system;
    (b) displaying, at the client system, one or more search results from the local cache in dependence on the captured characters of the one or more search terms;
    (c) attempting to connect from the client system to the remote server system and, upon connection:
        (c1) predicting search terms in dependence on the captured characters;
        (c2) obtaining search results for a predetermined number of the predicted search terms from the remote server system;
        (c3) merging the obtained search results from the remote server system into the search results that are being displayed at the client system; and
        (c4) displaying, at the client system, at least a subset of the merged search results;
    periodically refreshing the local cache according to one or more parameters of said periodic refresh; and
    upon connection from the client system to the remote server system, receiving at the client system instructions configured to tune the one or more parameters of said periodic refresh and cause a change to the one or more parameters.

2. The method of claim 1, further comprising: repeating steps (b) and (c) for each captured character, wherein the search results displayed in step (c4) are refreshed during each repetition.

3. The method of claim 1, wherein step (c2) further comprises: ranking the predicted search terms and selecting the predetermined number of predicted search terms from highest ranked predicted search terms.

4. The method of claim 3, wherein the ranking is performed in dependence on one or more of: probability of use of a term, prior user searches, user location, user interests, and similar user searches.

5. The method of claim 1, wherein the search terms and corresponding search results maintained in the local cache are selected in dependence on a rank of search terms, the N highest ranked search terms and corresponding search results being selected to be locally cached, wherein N is determined in dependence on one or more of: storage capacity of the client system and available network bandwidth.

6. The method of claim 5, wherein the rank is determined in dependence on one or more of: probability of use of a term, prior user searches, user location, user interests, and similar user searches.

7. The method of claim 1, further comprising:
connecting from the client system to a data communications network to perform said periodic refresh; said periodic refresh having a frequency and the instructions being configured to tune the frequency in dependence on bandwidth available to the client system on the data communications network.

8. The method of claim 7 further comprising: determining the bandwidth in dependence on one or more of: a ping time between the client system and the remote server system; a data transfer rate available to the client system for accessing the data communications network; and time of day.

9. The method of claim 1, further comprising: forcing the client system to fully refresh the local cache upon the client system entering a different location to that previously occupied.

10. The method of claim 1, further comprising: periodically uploading ping times by the client system to the remote server system for determining tuning of the one or more parameters.

11. A search system comprising a client system and a remote server system arranged to communicate with the client system, wherein:
the client system includes a local cache memory storing one or more search terms and corresponding search results pre-fetched from the remote server system concerning searches presented to the remote server system by users other than users of the client system, the client system being arranged to execute an algorithm to:
capture characters of one or more search terms as they are entered into the client system;
display, at the client system, one or more search results from the local cache in dependence on the captured characters of the one or more search terms;
periodically refresh the local cache according to one or more parameters of said periodic refresh;
attempt to connect from the client system to the remote server system to communicate the captured characters;
the remote server system being arranged to receive the captured characters from the client system, predict search terms in dependence on the received characters, obtain search results for a predetermined number of the predicted search terms and transmit the obtained search results to the client system, generate instructions configured to tune the one or more parameters of said periodic refresh and transmit the instructions;
the client system being arranged, to receive the instructions and cause a change to the one or more parameters; and
the client system being arranged, upon receipt of search results from the remote server system, to merge the search results with the search results from the local cache and display at least a subset of the merged search results.

12. The search system of claim 11, further comprising an information repository comprising data on search terms, wherein the remote server system is arranged to rank the predicted search terms in dependence on data on said search terms in said information repository and select the predetermined number of predicted search terms from highest ranked predicted search terms.

13. The search system of claim 12, wherein the data on search terms includes one or more of: probability of use of a term, statistics of prior user searches, association of a term with a location, user interests, and probability of matching similar user searches.

14. The search system of claim 11, wherein the search terms and corresponding search results obtained for the local memory cache are selected in dependence on a rank of search terms, the N highest ranked search terms and corresponding search results being selected for the local memory cached, wherein N is determined in dependence on one or more of:
storage capacity of the client system and available network bandwidth.

15. The search system according to claim 11, the client system being arranged to connect to a data communications network to perform said periodic refresh, said periodic refresh having a frequency and the instructions being configured to tune the frequency in dependence on bandwidth available to the client system on the data communications network.

16. The search system according to claim 15, wherein the bandwidth is determined in dependence on one or more of: a ping time between the client system and the remote server system; a data transfer rate available to the client system for accessing the data communications network; and time of day.

17. The search system according to claim 11, the client system being arranged to be forced to fully refresh the local cache upon entering a different location to that previously occupied.

18. The search system according to claim 11, the client system being arranged to periodically upload ping times to the remote server system for determining tuning of the one or more parameters.

* * * * *